Patented Jan. 7, 1947

2,413,697

UNITED STATES PATENT OFFICE 2,413,697

RESINOUS COMPOSITIONS

Donald E. Edgar, Philadelphia, Pa., assignor to E. I. du Pont de Nemours & Company, Wilmington, Del., a corporation of Delaware No Drawing. Application August 28, 1941, Serial No. 408,621

9 Claims. (Cl. 260—42)

This invention relates to resinous compositions and more particularly to the manufacture of new and useful mixed amide-polyamide type resins.

The products of the reaction of urea and aldehydes, particularly formaldehyde, are well known in the art. These products possess desirable properties of hardness and strength and further have excellent color, transparency and fastness to light. While such products have been used in the field of cast and molded plastics, little use has been made of them in the field of coating compositions to produce decorative and protective films up to within very recent years. The principal difficulty in the use of the urea-aldehyde resins as decorative and protective coating compositions has been the brittleness and lack of proper toughness of the resulting films. Methods for plasticizing ordinary molded plastics were found not to be satisfactory for plasticizing compositions for use as coatings. There has recently been developed a satisfactory urea-aldehyde resin solution of the urea-aldehyde-monohydric alcohol type for decorative and protective coating composition which has been extensively used in the industry. Such a resin is described and claimed in U. S. Patent No. 2,191,957. Films prepared from such resin compositions possess many desirable and improved properties over resins previously used in the art and their development was a distinct and valuable advance in the decorative coating composition art. Further improvements are still desirable, among which are reduction in baking time, greater toughness and flexibility of film produced, better adhesion of film to a base surface, greater water and alkali resistance, etc. Modifications of the urea-aldehyde resins have been proposed, such as the use therewith of an amino triazine and substituted amino triazine-aldehyde resins. The use of these resinous materials with the urea-aldehyde resins while effecting improvement in some respects is deficient in others and the economics in general are not favorable.

An object of this invention, therefore, is the provision of decorative and protective coating compositions, films of which will attain in a shorter time at a given temperature a degree of hardness and toughness equal or superior to that of the quickest curing finishes now available.

Another object is the preparation of new and useful resins of the amide-polyamide type which possess improved toughness, hardness and flexibility over urea-formaldehyde type resins heretofore made.

Still another object is the provision of amide-polyamide type resins which are compatible with plasticizers and other film forming materials which are further soluble in available solvents for commercial use, such as hydrocarbons.

A further object is the provision of amide-polyamide type resins which produce decorative and protective coatings of improved toughness, hardness and flexibility; improved mar resistance and water and alkali resistance.

Other objects will appear as the description of the invention proceeds.

These objects are accomplished by reacting a monohydric alcohol, urea and/or amino triazines, substituted amino triazines and related substances, formaldehyde and a polyamide forming composition.

The term "polyamide" is described and defined in U. S. Patent No. 2,130,948—W. H. Carothers—September 20, 1938, and has the same significance as given in the patent. The term "polyamide forming compositions" refers to materials which polymerize to polyamides as defined above without the addition of other reacting compounds.

The manner of carrying out the present invention will be more fully understood by the following examples which are given by way of illustration but not by way of limitation except insofar as defined in the appended claims. The parts are by weight.

A suitable apparatus for carrying out the invention comprises essentially a reaction vessel or still provided with a thermometer, a mechanical stirrer and a tube which leads to a water cooled condenser. At the exit end of the condenser there is attached a water separator which is open to the atmosphere through a suitable tube. The upper part of the separator is connected by means of a tube provided with a suitable trap, to the still or reaction vessel through which a portion or all of the condensate may, if desired, be returned to the reaction vessel.

*Example 1*

| | Parts |
|---|---|
| Formaldehyde solution (37% aqueous solution) | 450 |
| Crystalline urea | 150 |
| n-Butyl alcohol | 510 |
| Toluene | 75 |
| Phthalic anhydride | 6 |
| Hexamethylene diammonium adipate | 30 |

The formaldehyde solution was placed in the reaction vessel and adjusted to pH of approximately 8.6 by the addition of aqueous sodium hydroxide solution. The urea and butyl alcohol were then added and the mass then heated at 90–92° C. with constant agitation for approximately 30 minutes. The liquid mass in the reaction vessel was allowed to cool to approximately 86–88° C. and then the toluene, phthalic anhydride and hexamethylene diammonium adipate added. Heat was then applied and the temperature raised to the boiling point (approximately 91° C.) and the solution distilled, the condensate collecting in the separator to form an aqueous and a non-aqueous layer. The water was removed from the system through the separator and the non-aqueous portion (consisting essentially of butyl alcohol and toluene) was returned to the reaction vessel as noted under description of the apparatus above. The reaction was carried on until approximately 357 parts of water had been removed. The distillation was continued and an additional 280 parts of condensate collected and removed from the system. The resulting product was a clear, viscous resin solution with a solids content of approximately 65%. A coating of the resin solution on a steel panel when baked for 30 minutes at 100° C. yielded a clear, hard, tough and flexible film with improved properties over a film similarly prepared from a urea-formaldehyde monohydric alcohol resin solution. The time of baking to a hard film was also appreciably less viz. one hour for the urea-formaldehyde-monomhydric alcohol resin as against 30 minutes for the resin of the example.

Example II

| | Parts |
|---|---|
| Formaldehyde solution (37% aqueous solution) | 450 |
| Crystalline urea | 150 |
| n-Butyl alcohol | 510 |
| Hexamethylene diammonium adipate | 60 |
| Toluene | 75 |
| Phthalic anhydride | 6 |

The formaldehyde solution was placed in the reaction vessel and the pH adjusted to 8.6 by the addition of aqueous sodium hydroxide solution. The urea, butyl alcohol and hexamethylene diammonium adipate were then added, heat applied and the temperature raised to approximately 90° C. and so maintained for approximately 30 minutes. The reaction mass was then allowed to cool slightly and the toluene and phthalic anhydride added. Heating was continued at boiling temperature of the mass and the reaction carried on as described under Example I until approximately 350 parts of water were removed through the condensate separator. The distillation was then continued without the return of any condensate to the reaction vessel until an additional 250 parts of liquid had been removed. The resulting product had a solids content of approximately 56% and yielded a somewhat harder and tougher film than that of Example I when baked at the same temperature.

Example III

| | Parts |
|---|---|
| Formaldehyde solution (37% aqueous solution) | 450 |
| Crystalline urea | 150 |
| n-Butyl alcohol | 510 |
| Toluene | 75 |
| Phthalic anhydride | 6 |
| Hexamethylene diammonium sebacate (48.8% aqueous solution) | 61.5 |

The procedure used in preparing the resin was that as described under Example I. In the first part of the distillation 375 parts of water were removed and in the later distillation 235 parts of liquid were distilled from the reacting mass. The resulting product was similar in baking speed and film characteristics to that of Example I but possessing a somewhat greater flexibility. The solids content of the resin solution was 57.6%.

Example IV

| | Parts |
|---|---|
| Formaldehyde solution (37% aqueous solution) | 450 |
| Urea | 150 |
| n-Butyl alcohol | 510 |
| Hexamethylene diammonium adipate solution | 140 |
| Toluene | 75 |
| Phosphorous acid (23.6% solution) | 7 |

The hexamethylene diammonium adipate solution used was a 43% aqueous solution.

The resin was prepared according to the procedure described under Example II and the resulting product was substantially the same as that obtained in Example II. The distinguishing feature is the use of phosphorous acid in place of phthalic acid as the acid catalyst.

The resulting resin produces films similar to those obtained with the resin solution obtained according to Example II. The resin solution produced as described above had a solids content of 60.6%.

Example V

| | Parts |
|---|---|
| Formaldehyde solution (37% aqueous solution) | 225 |
| Urea | 75 |
| n-Butyl alcohol | 255 |
| Hexamethylene diammonium oxalate | 15 |
| Toluene | 35 |
| Phthalic anhydride | 3 |

The above ingredients were reacted according to the procedure described under Example II. The resulting resin solution was clear and contained 44.3% solids. It baked rapidly to a hard film which however, was somewhat less flexible than films obtained from the resin solution of Example II.

Example VI

| | Parts |
|---|---|
| Formaldehyde solution (37% aqueous solution) | 225 |
| Urea | 75 |
| n-Butyl alcohol | 255 |
| Decamethylene diammonium sebacate | 15 |
| Toluene | 35 |
| Phthalic anhydride | 3 |

This resin was prepared in accordance with the procedure used in the previous example. The product obtained was a clear solution containing 54.3% solids. It baked rapidly to a hard, tough film which was somewhat more flexible than films obtained from the resin of Example II.

Example VII

| | Parts |
|---|---|
| Formaldehyde solution (37% aqueous solution) | 225 |
| Urea | 75 |
| n-Butyl alcohol | 255 |
| Heptamethylene diammonium pimelate | 15 |
| Toluene | 35 |
| Phthalic anhydride | 3 |

The formaldehyde solution was adjusted to a pH of 8.6 by the addition of an aqueous solution of sodium hydroxide. The urea, n-butyl alcohol and heptamethylene diammonium pimelate were then added and the temperature of the mass raised to 90-92° C. and held at this point for approximately 30 minutes. The toluene and phthalic anhydride were then added and the entire reaction mass heated to distillation temperature. The condensate was collected in the separator and the non-aqueous portion returned to the reaction vessel and the aqueous portion removed from the system. Water was removed until the temperature reached approximately 100° C. and the mass then concentrated to approximately 56% solids content by the removal of alcohol. The finished resin solution was a clear, viscous liquid which yielded films similar to those obtained from the resin as described in Example I.

*Example VIII*

| | Parts |
|---|---|
| Formaldehyde solution (37% aqueous solution) | 225 |
| Urea | 75 |
| n-Butyl alcohol | 255 |
| Bis (p-beta aminoethyl) benzene sebacate | 15 |
| Toluene | 35 |
| Phthalic anhydride | 3 |

The resin solution was prepared in accordance with the procedure described under Example VII and yielded films which were hard and tough although somewhat less flexible than those obtained from the resin solution of Example I. The solids content of the resin solution was 58.6%.

*Example IX*

| | Parts |
|---|---|
| Formaldehyde solution (37% aqueous solution) | 642 |
| Melamine | 302 |
| n-Butyl alcohol | 1050 |
| Toluene | 88 |
| Hexamethylene diammonium adipate solution (43% aqueous solution) | 55 |

As in the previous examples the formaldehyde solution was adjusted to a pH of 8.6 by addition of an aqueous solution of sodium hydroxide. The melamine and n-butyl alcohol were then added and the mass heated at 90–95° C. until clear (approximately 35 minutes). The toluene and hexamethylene diammonium adipate solution were then added and the mass distilled as previously described. The final resin solution was then concentrated to a solids content of 69.6% by the removal of solvent. The finished product was a clear viscous solution which baked very rapidly to yield films which were more flexible than would have been obtained from a resin prepared from melamine and formaldehyde without the amine salt.

*Example X*

| | Parts |
|---|---|
| Formaldehyde solution (37% aqueous solution) | 225 |
| Urea | 75 |
| n-Butyl alcohol | 255 |
| Ethylene diammonium sebacate | 15 |
| Toluene | 35 |
| Phthalic anhydride | 3 |

The resin solution was prepared according to the procedure previously described under Example II. The resulting product was a clear light yellow colored solution which baked rapidly to produce a film which was somewhat less flexible than films from the resin solution of Example I. The solids content of the resin solution was 58.6%.

*Example XI*

| | Parts |
|---|---|
| Formaldehyde solution (37% aqueous solution) | 225 |
| Urea | 75 |
| Isobutyl alcohol | 255 |
| Hexamethylene diammonium adipate solution (43% aqueous solution) | 15 |
| Toluene | 35 |
| Phthalic anhydride | 3 |

The resin solution was prepared as noted under Example X, the resulting product being similar in most respects to the resin solution produced according to Example I. The solids content of the resin solution was 72.8%.

*Example XII*

This example illustrates the use of a preformed urea-formaldehyde reaction product in place of urea and formaldehyde as such. The dimethylol urea may be conveniently prepared by methods well known to those skilled in the art.

| | Parts |
|---|---|
| Dimethylol urea | 500 |
| n-Butyl alcohol | 850 |
| Toluene | 85 |
| Phthalic anhydride | 10 |
| Hexamethylene diammonium adipate | 50 |

The ingredients were charged into the reaction vessel, heated and water removed from the condensate as previously described until the temperature of the reacting mass reached approximately 100° C. The resinous reaction product solution was then concentrated by removal of the entire condensate obtained in the continued heating until the reaction mass reached a temperature of approximately 120° C. The resulting resin solution was clear and colorless and similar in baking speed and film characteristics to the resin solution produced under Example I. The solids content of the resin solution was 60.9%.

*Example XIII*

| | Parts |
|---|---|
| Formaldehyde solution (37% aqueous solution) | 225 |
| Urea | 75 |
| Benzyl alcohol | 300 |
| Hexamethylene diammonium adipate | 15 |
| Toluene | 30 |
| Phthalic anhydride | 3 |

The formaldehyde solution was adjusted to a pH of 8.6 by the addition of aqueous sodium hydroxide and the urea, benzyl alcohol and hexamethylene diammonium adipate then added. The mass was heated to 90-92° C. and this temperature maintained for approximately 30 minutes. The toluene and phthalic anhydride were then added and the mass heated to distillation until approximately 170 parts of water were separated and removed from the condensate. The resinous solution was then concentrated by the removal of benzyl alcohol by distillation at 135° C. under reduced pressure. The final resin solution had a solids content of 53.4% and was clear and practically colorless with slow setting characteristics. Baking at 100° C. for approximately 45 minutes yielded a film similar to that obtained under Example I.

Example XIV

This example shows the preparation of the resinous complex with the use of an excess of formaldehyde (approximately 25%) over the stoichiometrical amount required to form dimethylol urea with the urea used.

| | Parts |
|---|---|
| Formaldehyde solution (37% aqueous solution) | 507 |
| Urea | 150 |
| n-Butyl alcohol | 510 |
| Hexamethylene diammonium adipate | 30 |
| Toluene | 75 |
| Phthalic anhydride | 6 |

The resin solution was prepared in accordance with the procedure described under Example XIII. The water was removed in the manner previously described at a temperature of approximately 90° C. The resin solution was finally concentrated by removal of a portion of the n-butyl alcohol by distillation until the reaction mass reached a temperature of approximately 120° C.

The resulting resin solution was clear and colorless with a solids content of 56.9%. It yielded very flexible films which were much harder than a similar urea-foraldehyde resin containing the same urea-formaldehyde ratio.

Example XV

This example shows the use of phosphoric acid as the acid catalyst in producing the resinous complex.

| | Parts |
|---|---|
| Formaldehyde solution (37% aqueous solution) | 225 |
| Urea | 75 |
| n-Butyl alcohol | 255 |
| Hexamethylene diammonium adipate | 15 |
| Toluene | 30 |
| Phosphoric acid (85% syrup) | 3.5 |

The resinous solution was prepared according to the regular procedure previously described under Example I. The finished product was similar to that obtained in Example I but was slightly faster in baking speed. The solids content of the resin solution was approximately 58%.

Example XVI

This example shows the use of a mixture of urea and an amino triazine (melamine) with the polyamide salt in the production of the resinous complex solution under acid conditions.

| | Parts |
|---|---|
| Formaldehyde solution (37% aqueous solution) | 450 |
| Urea | 120 |
| n-Butyl alcohol | 700 |
| Melamine | 45 |
| Hexamethylene diammonium adipate | 24 |
| Toluene | 50 |
| Phosphoric acid (85% syrup) | 1.2 |

The formaldehyde was adjusted to a pH of approximately 8.6 and then were added the urea, butyl alcohol, melamine and hexamethylene diammonium adipate. The mass was then heated to approximately 90–92° C. and maintained at this temperature for approximately 30 minutes. The toluene and phosphoric acid were then added and the entire mass subjected to distillation as previously described until approximately 350 parts of water were removed from the condensate. The resinous solution was then concentrated to 52.5% solids by the removal of approximately 300 parts of the solvent through distillation. The finished resinous solution was clear colorless and baked more rapidly than the resin of Example IX to give films of excellent flexibility.

Example XVII

| | Parts |
|---|---|
| Formaldehyde solution (37% aqueous solution) | 450 |
| Urea | 150 |
| n-Butyl alcohol | 510 |
| Hexamethylene diammonium maleate | 30 |
| Toluene | 75 |
| Phthalic anhydride | 6 |

The resin was prepared according to the procedure previously described. The final product was clear, yellow in color and had a solids content of approximately 55%.

In place of urea, solely or in part, substituted ureas such as alkyl, aryl and acyl ureas, thioureas, guanidine and substituted guanidines, amino triazines and substituted amino triazines may be used in the above examples. The methylol compounds of these materials may be used in a manner similar to the use of methylol urea.

In addition to the alcohols of the examples, methyl, ethyl and propyl alcohol may be used as well as the other higher monohydric alcohols as cyclohexyl, octyl alcohol, etc. Benzene and other hydrocarbons may be used in place of the toluol which is given in the examples. In certain instances the use of the hydrocarbon may be dispensed with since the water may be satisfactorily removed by other means, as for example, by the use of silica gel in the separator, the use of an auxiliary fractionating column to separate the water from the alcohol before the latter is returned to the reaction vessel or by other suitable and convenient means.

Other catalysts, than those noted in the examples which may be used are materials of an acidic nature, such as benzoic, formic, acetic and similar monocarboxylic acids, maleic acid, adipic acid and similar dicarboxylic acids as well as such tricarboxylic acids as citric acid, also acid salts and acid resins as rosin, etc. and alkyd type resins. Other inorganic acids as hydrochloric and sulphuric acid are satisfactory when used in the proper amounts. Also certain inorganic salts as mercuric chloride, aluminum chloride, stannic chloride as well as the halogens as bromine and iodine may be used.

The amount of alcohol used in the preparation of the resin complex should be preferably not less than in the ratio of 1.4:1 alcohol to the theoretical amount of dimethylol urea, or its equivalent if other amides are used as represented by the urea, etc., and formaldehyde used. Greater amounts of alcohol may be satisfactorily used but any great increased ratios used should be governed by economic and other considerations which will be readily apparent to those skilled in the art.

While the most ordinarily convenient condition under which to carry out the reaction is atmospheric pressure, the reaction, if desired, may be carried out under sub or superatmospheric conditions.

The resinous compositions prepared as described possess sufficient flexibility for many purposes but may be advantageously blended with other film forming materials as alkyd resin, other types of synthetic resin, oleo-resinous varnishes, lacquers prepared from cellulose esters (organic and inorganic), cellulose ethers, etc. as well as with drying oils, non-drying oils and waxes. The resinous compositions may also be blended with natural resins such as Congo, copal, damar, etc. Where increased flexibility is desired plasticizers may be used among which may be mentioned dibutyl phthalate, tricresyl and triphenyl phosphate, dicyclohexyl phthalate, ethyl tartrate, butyl tartrate, ethyl and butyl lactate, etc.

Pigments and dyes may be incorporated with the resinous materials to produce desired color in the finished product and various types of fillers may also be used.

Compositions thus prepared will harden satisfactorily on air drying but may be baked at relatively low temperatures for a period of time, such as at 60° C. for 1 hour. Baking may be carried out at higher temperatures, if desired, such as, at 150° C. for ½ hour. Still higher temperatures may be used in which instances proportionately shorter periods of time for baking may be required. The choice of the temperature at which the compositions suitably applied are baked and the time periods of such baking will be governed by the particular properties desired in the finished films and will be readily apparent to those familiar with the art of producing films from such resinous compositions.

The products of the present invention are particularly adaptable for use as protective and decorative coatings on various types of surfaces as metal, wood, glass, rubber and rubber-like materials, molded plastic, synthetic resin products, etc. and may be applied by methods well known in the art as by spraying, brushing or dipping.

Coatings prepared from the new resinous materials possess as advantages over resinous materials of the present state of the art increased baking potential or reduced time of baking; greater toughness and flexibility of the film produced; markedly increased adhesion to the base to which applied; greater resistance to marring and markedly improved water and alkali resistance. They are, therefore, applicable for many uses for which materials of the present state of the art are deficient in one or more desirable or necessary properties. Other advantages will be readily apparent to those skilled in the art of manufacturing and using resinous compositions.

The new resinous compositions of the present invention are useful as protective and decorative coatings for fabrics of various types, paper, regenerated cellulose and cellulose ester and their films, felted bases, leather, etc. They may also be used in the electrical industry for impregnating coils of various types, and as insulating material for wire either as a coating or an impregnant. They may be further used as stiffening agents for felt, straw, etc. The compositions may be used in preparing cast or molded products as well as for adhesives and similar purposes.

It will be seen from the foregoing description that new and useful resinous compositions comprising the reaction product of a monohydric alcohol, urea and/or amino triazines, substituted amino triazines and related substances, and formaldehyde together with polyamide forming substances may be prepared in a form to be readily used as protective and decorative coating compositions alone or in combination with other film forming materials to produce films which are hard, tough, flexible and water resistant. The polyamide forming substance ingredient may be used in varying proportions, such proportions being governed to a great extent by the properties desired in the finished resinous complex and the choice of the amount to be used will be readily apparent to those skilled in the art of preparing resinous compositions.

It is apparent that many widely different embodiments of this invention may be made without departing from the spirit and scope thereof, and therefore, it is not intended to be limited except as indicated in the appended claims.

I claim:

1. A resinous composition comprising the reaction product obtained by heating simultaneously between 90° C. and 120° C. a linear polyamide forming composition comprising a primary diamine-dicarboxylic salt, a monohydric alcohol, formaldehyde, and material selected from the group consisting of urea, guanidine and an amino triazine.

2. The composition of claim 1 in which the monohydric alcohol is butyl alcohol.

3. A composition which hardens by air-drying, comprising a pigment and the resinous mass obtained by heating simultaneously between about 90° C. and 120° C. under reacting conditions urea, formaldehyde, a monohydric alcohol, and a linear polyamide forming composition containing a primary diamine dicarboxylic acid salt.

4. The product of claim 3 in which the alcohol is butyl alcohol.

5. The product of claim 3 in which the primary diamine dicarboxylic acid salt is a hexamethylene diammonium salt of a dicarboxylic acid.

6. The product of claim 3 in which the primary diamine dicarboxylic acid salt is a hexamethylene diammonium salt of adipic acid.

7. The product of claim 3 in which the primary diamine dicarboxylic acid salt is a hexamethylene diammonium salt of sebacic acid.

8. The product of claim 3 in which the primary diamine dicarboxylic acid salt is a hexamethylene diammonium salt of oxalic acid.

9. The reaction product obtained by heating the following ingredients at between about 90° C. and 120° C.

| | Parts |
|---|---|
| Formaldehyde solution (37%) | 450 |
| Urea | 150 |
| n-Butyl alcohol | 510 |
| Hexamethylene diammonium adipate | 30 |

DONALD E. EDGAR.